United States Patent
Baek et al.

(10) Patent No.: US 11,887,348 B2
(45) Date of Patent: Jan. 30, 2024

(54) IMAGE PROCESSING METHOD AND APPARATUS, AND IMAGE PROCESSING TRAINING METHOD

(71) Applicant: SAMSUNG ELECTRONICS CO., LTD., Suwon-si (KR)

(72) Inventors: Jiwon Baek, Hwaseong-si (KR); Seong-Jin Park, Suwon-si (KR); Seungju Han, Seoul (KR); Insoo Kim, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 17/341,469

(22) Filed: Jun. 8, 2021

(65) Prior Publication Data
US 2022/0188559 A1 Jun. 16, 2022

(30) Foreign Application Priority Data
Dec. 16, 2020 (KR) .................. 10-2020-0176154

(51) Int. Cl.
*G06V 40/16* (2022.01)
*G06V 10/24* (2022.01)
(Continued)

(52) U.S. Cl.
CPC .......... *G06V 10/242* (2022.01); *G06F 18/214* (2023.01); *G06N 3/08* (2013.01);
(Continued)

(58) Field of Classification Search
CPC ........... G06T 2207/20084; G06T 13/40; G06T 17/00; G06T 2207/30196; G06T 11/001;
(Continued)

(56) References Cited

U.S. PATENT DOCUMENTS

2016/0379041 A1* 12/2016 Rhee ................. G06F 18/24133
382/118
2018/0197330 A1* 7/2018 Wang ................... G06V 40/169
(Continued)

FOREIGN PATENT DOCUMENTS

| KR | 10-2010-0090058 A | 8/2010 |
| KR | 10-2016-0096271 A | 8/2016 |
| KR | 10-2017-0050465 A | 5/2017 |

OTHER PUBLICATIONS

Tian, Yu, et al. "Cr-gan: learning complete representations for multi-view generation." *arXiv preprint arXiv:1806.11191* (2018). (7 Pages in English).

(Continued)

*Primary Examiner* — Quan M Hua
(74) *Attorney, Agent, or Firm* — NSIP Law

(57) ABSTRACT

A processor-implemented image processing method and apparatus are provided. The image processing method includes receiving an input image and rotation information associated with the input image, generating a feature vector of the input image based on pose information corresponding to the input image, generating an assistant feature vector which represents a target component according to a pose corresponding to the rotation information, based on the feature vector, the pose information, and the rotation information, and generating a target image which has the pose corresponding to the rotation information based on the feature vector and the assistant feature vector.

23 Claims, 12 Drawing Sheets

(51) Int. Cl.
*G06T 7/73* (2017.01)
*G06N 3/08* (2023.01)
*G06F 18/214* (2023.01)

(52) U.S. Cl.
CPC .............. *G06T 7/73* (2017.01); *G06V 40/171* (2022.01); *G06T 2207/20081* (2013.01); *G06T 2207/20084* (2013.01); *G06T 2207/30201* (2013.01)

(58) Field of Classification Search
CPC . G06T 15/04; G06T 11/60; G06T 7/11; G06T 7/73; G06T 5/50; G06T 1/60; G06T 7/70; G06T 7/90; G06T 15/005; G06T 2207/20212; G06T 2207/20221; G06T 2207/20224; G06T 2207/30244; G06T 15/205; G06T 7/00; G06T 2207/30201; G06T 7/246; G06T 7/251; G06T 7/20; G06V 10/82; G06V 10/806; G06V 20/20; G06V 20/647; G06V 40/103; G06V 40/20; G06V 40/171; G06V 40/174; G06N 3/045; G06N 3/08; G06N 20/00; G06N 3/0464
See application file for complete search history.

(56) References Cited

U.S. PATENT DOCUMENTS

| | | |
|---|---|---|
| 2019/0286884 A1 | 9/2019 | Rhee et al. |
| 2019/0370529 A1 | 12/2019 | Kumar et al. |
| 2020/0013212 A1 | 1/2020 | Wang et al. |
| 2020/0110925 A1* | 4/2020 | Wang .................... G06V 10/82 |
| 2020/0265219 A1 | 8/2020 | Liu et al. |
| 2021/0407200 A1* | 12/2021 | Fu ......................... G06T 17/205 |
| 2022/0058377 A1 | 2/2022 | Baek et al. |

OTHER PUBLICATIONS

Hu, Yibo, et al. "Pose-guided photorealistic face rotation." *Proceedings of the IEEE conference on computer vision and pattern recognition*. 2018. (9 Pages in English).

Zhu, Zhen, et al. "Progressive pose attention transfer for person image generation." *Proceedings of the IEEE/CVF Conference on Computer Vision and Pattern Recognition*. 2019. (10 Pages in English).

* cited by examiner

IMAGE PROCESSING METHOD AND APPARATUS, AND IMAGE PROCESSING TRAINING METHOD

CROSS-REFERENCE TO RELATED APPLICATIONS

This application claims the benefit under 35 USC § 119(a) of Korean Patent Application No. 10-2020-0176154, filed on Dec. 16, 2020, in the Korean Intellectual Property Office, the entire disclosure of which is incorporated herein by reference for all purposes.

BACKGROUND

1. Field

The following description relates to an image processing method and apparatus that generates a facial image, and an image processing training method.

2. Description of Related Art

Facial recognition is a main technology that models a real-world image in a computer vision. Many technologies that implement facial recognition based on deep neural network learning have been developed. Facial recognition systems may generate a facial image, regardless of a pose of an input image. For example, when an image with a great change in pose is generated, but when a pose of an input image is not considered, it may be difficult to transfer feature vectors to generate components of a face, which may make it difficult to naturally generate an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented image processing method includes receiving an input image and rotation information associated with the input image; generating a feature vector of the input image based on pose information corresponding to the input image; generating an assistant feature vector which represents a target component according to a pose corresponding to the rotation information based on the feature vector, the pose information, and the rotation information; and generating a target image which has the pose corresponding to the rotation information based on the feature vector and the assistant feature vector.

The generating of the assistant feature vector may include converting the pose information to correspond to an intermediate layer of an encoder; generating a weight map which includes a position in which the target component is to be generated in the target image, based on the feature vector, the converted pose information and the rotation information; and generating the assistant feature vector which represents the target component corresponding to the pose in the position in which the target component is to be generated, by combining the weight map and a target feature vector separated from the feature vector.

The generating of the weight map may include generating the weight map which includes the position in which the target component is to be generated in the target image by applying the feature vector, the converted pose information, and the rotation information to a first neural network.

The generating of the weight map may include generating a weight map which includes a position in which each of a plurality of target components is to be generated in the target image, based on the feature vector, the converted pose information and the rotation information.

The generating of the assistant feature vector may include separating the target feature vector corresponding to the target component from the feature vector; and generating the assistant feature vector which represents the target component corresponding to the pose in the position in which the target component is to be generated, by combining the weight map and the target feature vector.

The generating of the feature vector may include estimating the pose information from the input image; applying the input image and the pose information to an encoder that outputs the feature vector; and acquiring the feature vector from an intermediate layer of the encoder.

The estimating of the pose information may include generating a landmark hit map corresponding to an object including the target component by extracting landmarks of the object from the input image; and estimating the pose information based on the landmark hit map.

The rotation information may include any one or any combination of a rotation direction in which an object in the input image is to be rotated to generate the target image, and a value which indicates a degree of rotation of the object.

The pose information may include a landmark hit map corresponding to a face included in the input image.

The generating of the target image may include generating the target image by decoding the feature vector with a decoder based on the assistant feature vector.

The generating of the target image may include generating the target image by summing the assistant feature vector and the feature vector during the decoding of the feature vector.

The input image may include a face; and the target component comprises any one or any combination of an eye, a nose, a mouth, and a mouth corner.

In a general aspect, a processor-implemented training method includes acquiring a (1-1)-th feature vector by encoding a first image and first pose information corresponding to the first image; acquiring a (1-2)-th feature vector by encoding a second image corresponding to a target image of the first image and second pose information corresponding to the second image; training an encoder to maintain an identity of an object included in each of the first image and the second image, regardless of a pose of the object, based on a difference between the (1-1)-th feature vector and the (1-2)-th feature vector; acquiring a second feature vector from an intermediate layer of the encoder; converting the first pose information to correspond to the intermediate layer; generating a weight map including a position in which a target component is to be generated in the second image which has a pose corresponding to rotation information by applying the second feature vector, the converted first pose information and the rotation information to a first neural network; separating a target feature vector corresponding to the target component from the second feature vector; generating an assistant feature vector which represents the target component corresponding to the pose in the position in which the target component is to be generated, by combining the weight map and the target feature vector; generating a third image by decoding, with a decoder, the (1-1)-th feature vector based on the assistant feature vector; and training the first neural network, the encoder and the decoder based on the second image and the third image.

In a general aspect, an image processing apparatus includes a communication interface configured to receive an input image and rotation information associated with the input image; and one or more processors, configured to generate a feature vector of the input image based on pose information corresponding to the input image; generate an assistant feature vector which represents a target component according to a pose corresponding to the rotation information, based on the feature vector, the pose information, and the rotation information; and generate a target image which has the pose corresponding to the rotation information based on the feature vector and the assistant feature vector.

The one or more processors may be configured to: convert the pose information to correspond to an intermediate layer of an encoder; generate a weight map which includes a position in which the target component is to be generated in the target image, based on the feature vector, the converted pose information and the rotation information; and generate the assistant feature vector which represents the target component corresponding to the pose in the position in which the target component is to be generated, by combining the weight map and a target feature vector separated from the feature vector.

The one or more processors may be configured to generate the weight map which includes the position in which the target component is to be generated in the target image by applying the feature vector, the converted pose information and the rotation information to a first neural network.

The one or more processors may be configured to generate a weight map which includes a position in which each of a plurality of target components is to be generated in the target image, based on the feature vector, the converted pose information and the rotation information.

The one or more processors may be configured to: separate the target feature vector corresponding to the target component from the feature vector; and generate the assistant feature vector which represents the target component corresponding to the pose in the position in which the target component is to be generated, by combining the weight map and the target feature vector.

The image processing apparatus may include any one or any combination of a user authentication device, an advanced driver-assistance systems (ADAS), a head-up display (HUD) device, a three-dimensional (3D) digital information display (DID), a navigation device, a neuromorphic device, a 3D mobile device, a smartphone, a smart television (TV), a smart vehicle, an Internet of things (IoT) device, and a medical device.

In a general aspect, a processor-implemented method includes receiving an input image, and pose information and rotation information corresponding to the input image; encoding the input image and the pose information with an encoder device, which includes a first neural network, to generate a first feature vector of the input image; generating a second feature vector, based on the pose information, the rotation in formation and the first feature vector; and generating a target image, which has a pose corresponding to the rotation information, based on the first feature vector and the second feature vector, wherein the target image is generated by decoding the first feature vector with a decoder device, which includes a second neural network, based on the second feature vector.

The pose corresponding to the rotation information may include at least one of a frontal pose or a side pose of a facial image.

The decoder may generate the target image by rotating an object in the input image by one or more of a rotational angle and a rotational direction corresponding to the rotation information.

Other features and aspects will be apparent from the following detailed description, the drawings, and the claims.

Figure 1:
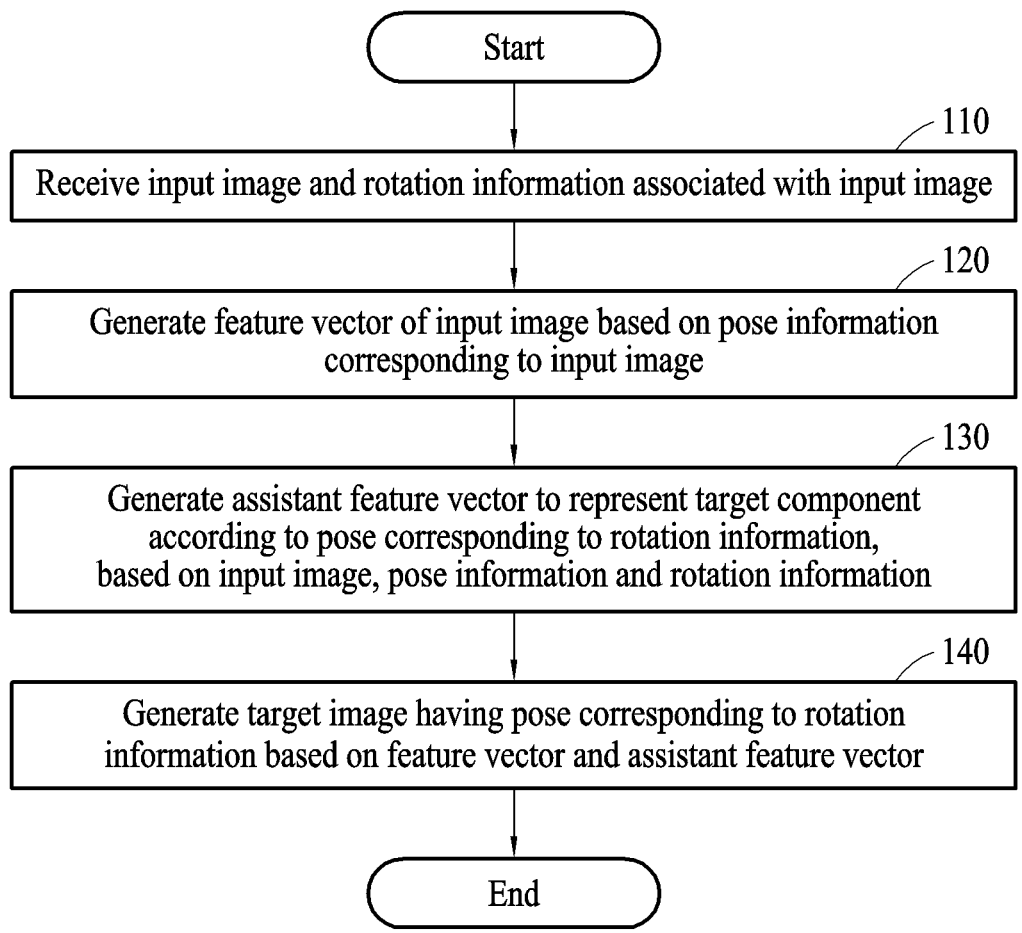
FIG. 1 illustrates an example image processing method, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the disclosure of this application. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of an image processing method, in accordance with one or more embodiments. FIG. 1 illustrates a process in which an image processing apparatus generates a target image having a pose corresponding to rotation information through operations 110 to 140. The target image may be captured by a sensing device that includes, as non-limiting examples, a sensor, an illuminator, and a processor. The sensing device may be included in a user device such as, but not limited to, a mobile phone or tablet device. The sensor may be positioned in the user device so as to capture image data of an object such as eyes, nose, or mouth of a user (e.g., a forward-facing camera).

The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in operation 110, the image processing apparatus may receive an input image and rotation information associated with the input image. The input image may include, but is not limited to, for example, various objects such as a face, a building, a vehicle, or a person. The "rotation information associated with the input image" may be construed as information regarding a direction and an angle in which the input image or an object in the input image should be rotated to convert the input image into a target image with a predetermined pose, for example, but not limited to, a frontal pose or a side pose. The rotation information may include, for example, any one or any combination of a rotation direction in which an object in the input image is to be rotated to generate a target image, and a value or information indicating a degree of rotation of the object. For example, when the rotation direction is a rightward direction, the rotation direction may be denoted by "+", and when the rotation direction is a leftward direction, the rotation direction may be denoted by "−". In an example, if a value indicating a degree of rotation of an object is "1", a rotation angle may correspond to 15 degrees, and if the value is "3", the rotation angle may correspond to 45 degrees. A unit of the degree of rotation may be, for example, 15 degrees as described above, but is not necessarily limited thereto. In an example, the rotation information associated with the input image may be entered directly by a user, or may be automatically set by the image processing apparatus.

In operation 120, the image processing apparatus may generate a feature vector of the input image based on pose information corresponding to the input image. The image processing apparatus may estimate the pose information from the input image. The image processing apparatus may generate a landmark hit map corresponding to an object including a target component (for example, an eye) by extracting landmarks of the object from the input image. The image processing apparatus may extract the pose information based on the landmark hit map. The "pose information" may correspond to information indicating a position of a main component of an object that may be used to analyze a pose or position of the object in an input image. In an example, when an object is a face, pose information may include a landmark hit map (for example, pose information 320 of FIG. 3) corresponding to a face in an input image (for example, an input image 310 of FIG. 3). The landmark hit map may correspond to a feature map in which a probability of corresponding to a main component of an object (for example, a face) is expressed as a value between "0" and "1" in units of pixels of an input image. A main component of a face may include, for example, an eye, an eyebrow, a nose, and a mouth.

Also, in operation 120, the image processing apparatus may apply the input image and the pose information to an encoder that outputs a first feature vector, and may acquire a feature vector from an intermediate layer of the encoder. In an example, the image processing apparatus may generate a first feature vector by encoding the input image by an encoder or an encoding module or device that includes a neural network. The first feature vector may include a feature vector associated with a pose of the input image. The feature vector associated with the pose of the input image may correspond to a feature vector that depends on a pose of an object (for example, a face) included in the input image, for example, an angle or a direction of the object. Also, the first feature vector of the input image may include a feature vector associated with identification information of the input image. The feature vector associated with the identification information of the input image may correspond to a feature vector associated with an identity of an object included in the input image, regardless of a pose of the object.

In operation 130, the image processing apparatus may generate an assistant feature vector to represent a target component according to a pose corresponding to the rotation information, based on the feature vector, the pose information, and the rotation information. The "target component" as used herein may be construed to be a portion of elements constituting an object included in the input image. In an example, when the object is a face, the target component may include any one or any combination of an eye, a nose, a mouth, and a mouth corner, but is not limited thereto. In an example, when the object is a person, the target component may include at least one of body parts, for example, an arm, a leg, a back, a torso, or a face of the person, but is not necessarily limited thereto. An example of operation 130 of generating an assistant feature vector will be further described below with reference to FIG. 2.

In operation 140, the image processing apparatus may generate a target image having the pose corresponding to the rotation information based on the feature vector and the assistant feature vector. The image processing apparatus may generate the target image by decoding the feature vector based on the assistant feature vector using a decoder. For example, the image processing apparatus may generate a target image having the pose corresponding to the rotation information by decoding the feature vector using a decoder or a decoding module or device that includes a neural network. The pose corresponding to the rotation information may be a pose of an object (for example, a face) corresponding to the rotation information, and may include, for example, a frontal pose or a side pose. The decoder or the decoding device may generate a target image by rotating a face in the input image by the pose (for example, an angle or a direction) corresponding to the rotation information.

For example, when the rotation information includes a plurality of rotation directions and/or a plurality of values indicating a degree of rotation of an object, the decoder may generate a plurality of target images having different poses based on the plurality of rotation directions and/or the plurality of values.

In operation 140, the image processing apparatus may generate a target image by summing the assistant feature vector with the feature vector during decoding. The image processing apparatus may sum the assistant feature vector and the feature vector by, for example, a residual summation. The image processing apparatus may perform a summation using various summation schemes, for example, a weighted summation, in addition to the residual summation.

Figure 2:
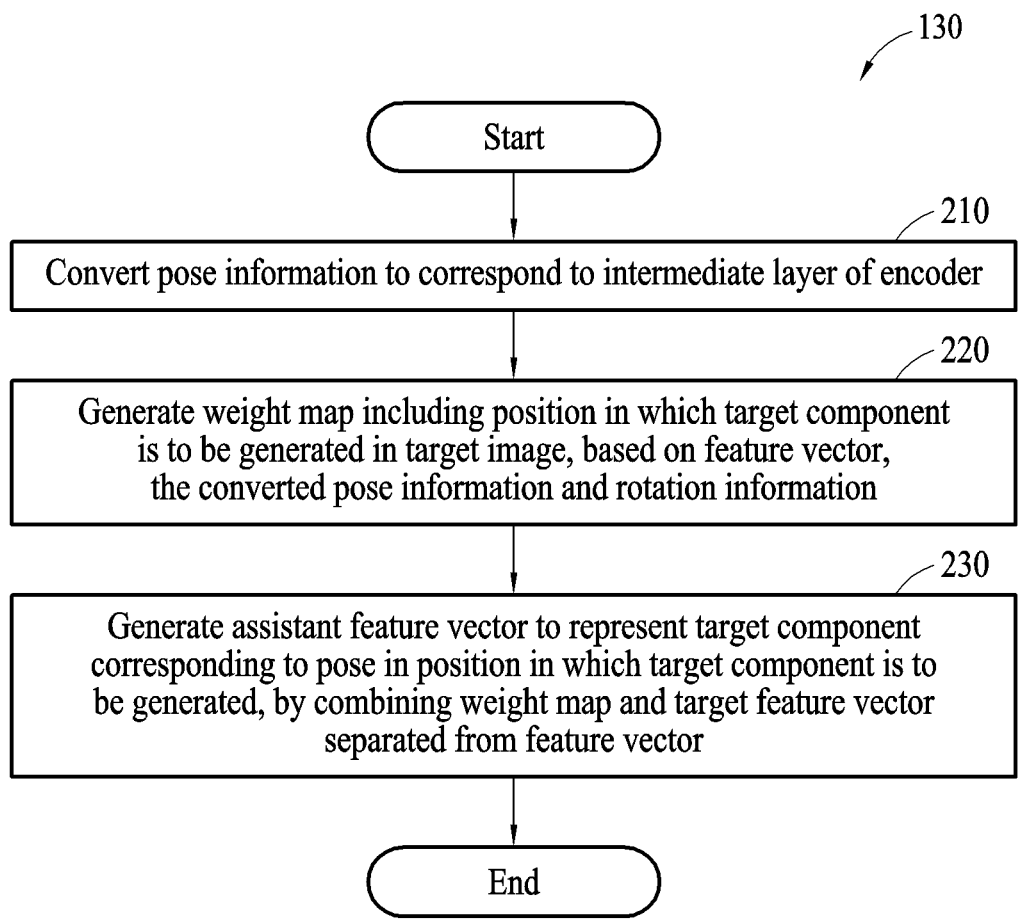
FIG. 2 illustrates an example of generating an assistant feature vector, in accordance with one or more embodiments.

FIG. 2 illustrates an example of generating an assistant feature vector, in accordance with one or more embodiments. FIG. 2 illustrates a process by which an image processing apparatus generates an assistant feature vector through operations 210 to 230. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In operation 210, the image processing apparatus may convert pose information to correspond to an intermediate layer of an encoder. In operation 210, the image processing apparatus may resize the pose information to have the same size as that of a feature vector (for example, a second feature vector) acquired from the intermediate layer of the encoder.

In operation 220, the image processing apparatus may generate a weight map including a position in which a target component is to be generated in the target image, based on a feature vector, the pose information converted in operation 210, and rotation information. For example, the image processing apparatus may apply the feature vector, the converted pose information, and the rotation information to a first neural network, to generate a weight map including a position in which a target component is to be generated in the target image. The neural network may be configured to perform, as non-limiting examples, object classification, object recognition, and image recognition by mutually mapping input data and output data in a nonlinear relationship based on deep learning. Such deep learning is indicative of processor implemented machine learning schemes for solving issues, such as issues related to automated image or object recognition from a data set, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, when a plurality of target components are present, the image processing apparatus may generate a weight map including a position in which each of the plurality of target components is to be generated in the target image, based on the feature vector, the converted pose information and the rotation information. In an example, when two target components correspond to a left eye and a right eye, the image processing apparatus may generate a weight map including a position in which the left eye is to be generated, and a weight map including a position in which the right eye is to be generated.

In operation 230, the image processing apparatus may generate an assistant feature vector to represent the target component corresponding to a pose in the position in which the target component is to be generated, by combining the weight map and a target feature vector separated from the feature vector. The assistant feature vector may correspond to, for example, information indicating a position in which a large number of feature vectors of the target component is needed.

In operation 230, the image processing apparatus may separate a target feature vector corresponding to the target component from the feature vector. The image processing apparatus may generate an assistant feature vector to represent the target component corresponding to the pose in the position in which the target component is to be generated, by combining the weight map and the target feature vector.

Figure 3:
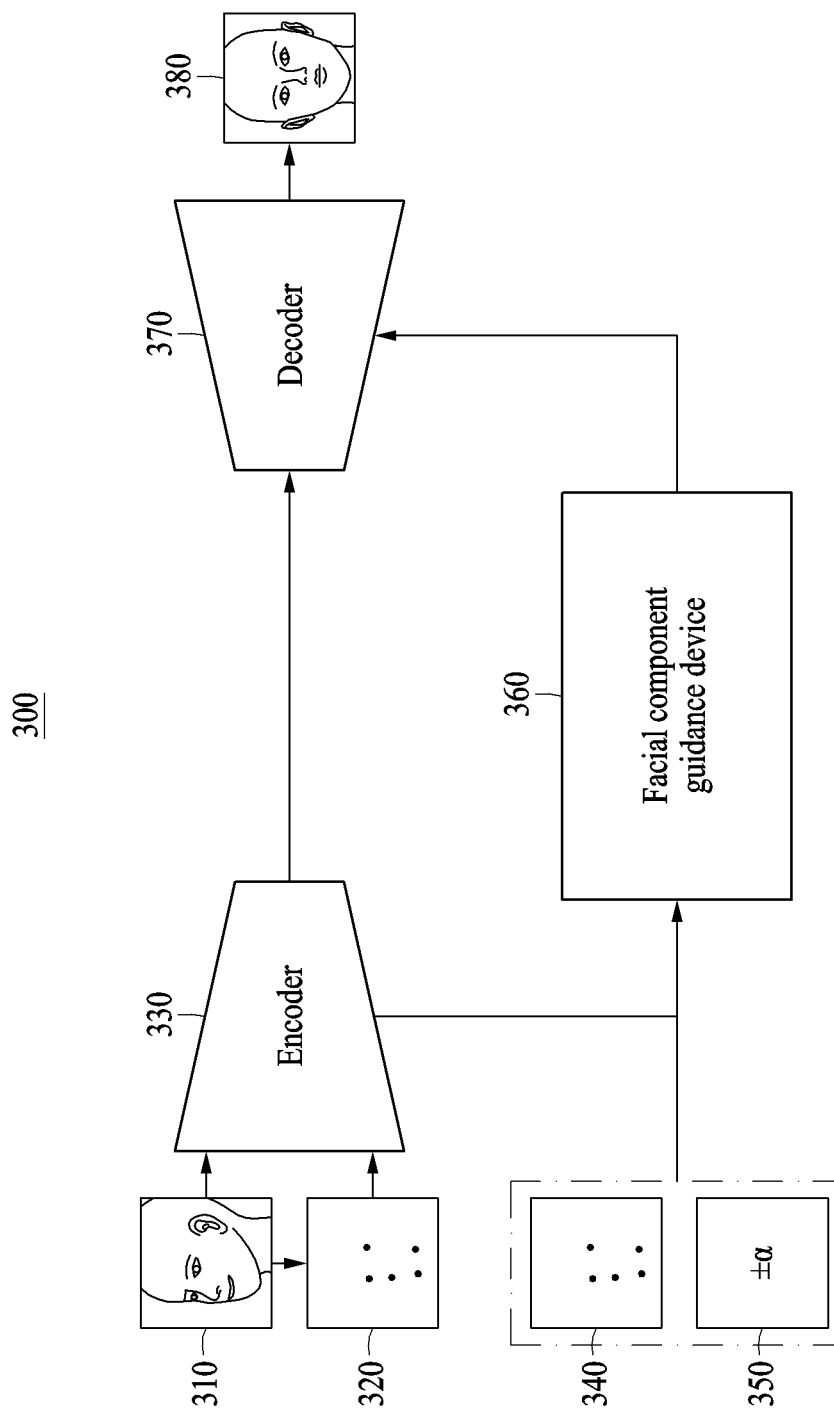
FIG. 3 illustrates an example of a structure of an image processing apparatus, in accordance with one or more embodiments.

FIG. 3 illustrates an example of a structure of an example image processing apparatus, in accordance with one or more embodiments.

Referring to FIG. 3, an image processing apparatus 300 may include an encoder 330, a facial component guidance device 360, and a decoder 370. Hereinafter, an example in which an object included in an input image is a face of a user, and in which a target component is an eye, is described below for convenience of description, however, there is no limitation thereto.

The image processing apparatus 300 may extract the pose information 320 corresponding to the input image 310.

The encoder 330 may output a first feature vector by encoding the input image 310 and the pose information 320. The image processing apparatus 300 or the encoder 330 of the image processing apparatus 300 may receive, as inputs, the input image 310 together with the pose information 320 corresponding to the input image 310, to encode the input image 310.

The facial component guidance device 360 may generate an assistant feature vector to represent a target component (for example, an eye) according to a pose corresponding to rotation information 350 associated with the input image 310, based on a second feature vector acquired from an intermediate layer of the encoder 330, pose information 340 obtained by converting the pose information 320 to correspond to the intermediate layer, and the rotation information 350. The pose information 340 may be obtained by processing the pose information 320 into a size suitable for an output size of the intermediate layer.

The decoder 370 may generate a target image 380 by decoding the first feature vector output from the encoder 330 based on the assistant feature vector generated by the facial component guidance module 360. In an example, the decoder 370 may generate target images 380 having various poses by rotating the face in the input image 310 in a rotation direction and a rotation angle corresponding to the rotation information 350 based on the first feature vector and the assistant feature vector.

Figure 4:
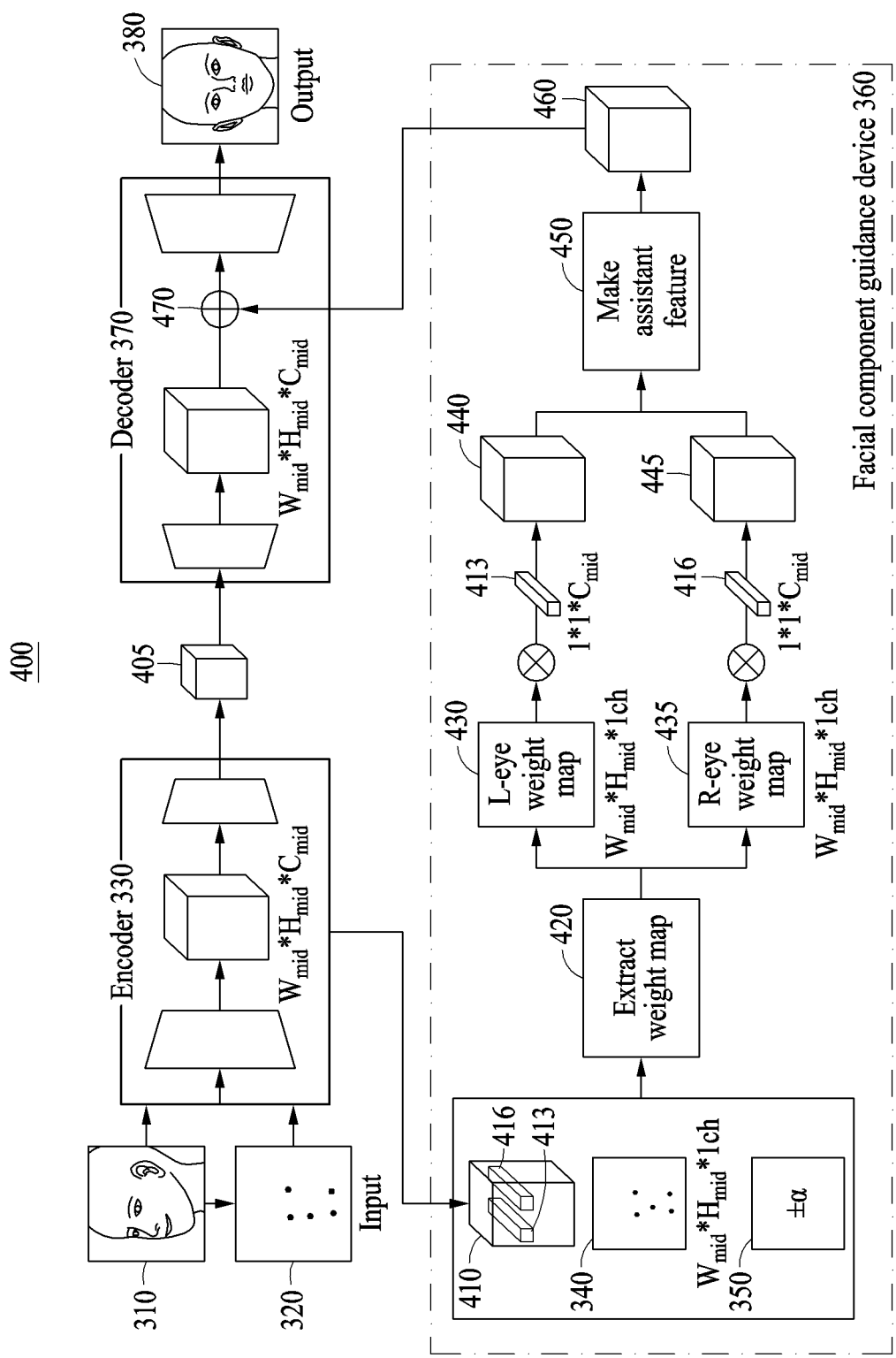
FIG. 4 illustrates another example of a structure of an image processing apparatus, in accordance with one or more embodiments.

FIG. 4 illustrates an example of a structure of an example image processing apparatus.

Referring to FIG. 4, an image processing apparatus 400 may include an encoder 330, a facial component guidance device 360, and a decoder 370.

The encoder 330 may output a first feature vector 405 by encoding an input image 310 and pose information 320. The encoder 330 may include, but is not limited to, for example, a neural network with a plurality of layers, for example, a deep neural network (DNN), or a convolutional neural network (CNN). The DNN may include a plurality of layers. For example, the deep neural network may include an input layer to which input data is applied, an output layer for outputting a result derived through prediction based on training and the input data, and a plurality of hidden layers for performing a neural network operation between the input layer and the output layer. In such an example, the DNN may be one or more of a fully connected network, a convolution neural network, a recurrent neural network, and the like, or may include different or overlapping neural network portions respectively with such full, convolutional, or recurrent connections, according to an algorithm used to process information.

The facial component guidance device 360 may acquire a second feature vector 410 from an intermediate layer of the encoder 330. The second feature vector 410 may include a predetermined number of channels with a predetermined size. For example, the second feature vector 410 may include "$C_{mid}$" channels with a size of $W_{mid} \times H_{mid}$, which may be expressed as $W_{mid} \times H_{mid} \times C_{mid}$. Here, "mid" may indicate that the second feature vector 410 is a vector acquired from the intermediate layer of the encoder 330.

In an example, when a single target component, as examples, a nose or a mouth, is included in an object, the second feature vector 410 may include a feature vector corresponding to a nose or a mouth included in a face. In another example, when a plurality of target components, for example, a left eye and a right eye, are included in an object, the second feature vector 410 may include second feature vectors 413 and 416 corresponding to the plurality of target components, as shown in FIG. 4. In this example, the second feature vector 413 may be a feature vector corresponding to the left eye, and the second feature vector 416 may be a feature vector corresponding to the right eye.

Additionally, the facial component guidance device 360 may convert the pose information 320 into pose information 340 with the same size as that of the second feature vector 410. The converting may correspond to resizing.

The facial component guidance device 360 may generate weight maps 430 and 435, each including a position in which a target component is to be generated in a target image, by applying the second feature vector 410, the pose information 340, and rotation information 350 to a first neural network 420.

The rotation information 350 may correspond to information with a size of W×H that includes information indicating a rotation direction so that the input image 310 may have a pose corresponding to rotation information. The rotation information 350 may correspond to data in which a value of each element of a two-dimensional (2D) matrix with a size of W×H is set to a first value or a second value based on a rotation direction. In an example, a first value indicating a leftward rotation may be "1", and a second value indicating a rightward rotation may be "−1". Also, the rotation information 350 may be set as a rotation direction and a value indicating a degree of rotation. In an example, when a leftward rotation and a rotation by 15 degrees are set, the rotation information 350 may be set to "1". In another example, when the leftward rotation and a rotation by 30 degrees are set, the rotation information 350 may be set to "2". In another example, when a rightward rotation and a rotation by 30 degrees are set, the rotation information 350 may be set to "−2".

When a single target component is present, a single weight map may be generated. When two target components are present, two weight maps, for example, the weight maps 430 and 435 of FIG. 4, may be generated.

The first neural network 420 may include neural networks with various structures and/or various types, for example, a DNN or a CNN. In an example, when the first neural network 420 is a CNN, each of the weight maps 430 and 435 may correspond to a feature map of one channel with a size of $W_{mid} \times H_{mid}$.

The facial component guidance device 360 may separate the second feature vectors 413 and 416 corresponding to target components from the second feature vector 410.

The facial component guidance device 360 may generate an assistant feature vector 460 to represent a target component corresponding to a pose in a position in which the target component is to be generated, by combining the weight maps 430 and 435 and the second feature vectors 413 and 416.

In an example, the facial component guidance device 360 may calculate a first result 440 by multiplying the weight map 430 and the second feature vector 413. The first result 440 may be, for example, $W_{\_mid} \times H_{\_mid} \times C_{\_mid}$ obtained by multiplying $W_{mid} \times H_{\_mid} \times 1ch$ of the weight map 430 and a feature vector ($1 \times 1 \times C_{\_mid}$) of the left eye, and may have a size of a local feature vector of a channel $C_{mid}$ with the size of $W_{mid} \times H_{\_mid}$.

Also, the facial component guidance device 360 may calculate a second result 445 by multiplying the weight map 435 and the second feature vector 416. The second result 445 may be, for example, $W_{mid} \times H_{\_mid} \times C_{\_mid}$ obtained by multiplying $W_{mid} \times H_{\_mid} \times 1ch$ of the weight map 435 and a feature vector ($1 \times 1 \times C_{\_mid}$) of the right eye, and may have a size of a local feature vector of a channel $C_{\_mid}$ with the size of $W_{\_mid} \times H_{\_mid}$. Thus, the facial component guidance device 360 may change "$2C_{\_mid}$" of $W_{\_mid} \times H_{\_mid} \times 2C_{\_mid}$ obtained by combining the first result 440 ($W_{\_mid} \times H_{\_mid} \times C_{\_mid}$) and the second result 445 ($W_{mid} \times H_{\_mid} \times C_{\_mid}$) to "$C_{\_mid}$" of $W_{\_mid} \times H_{\_mid} \times C_{\_mid}$, to finally generate the assistant feature vector 460 using an assistant feature generator 450. The assistant feature vector 460 may correspond to a feature vector of a channel $C_{\_mid}$ with the size of $W_{\_mid} \times H_{\_mid}$.

The image processing apparatus 400 may generate a target image 380 by decoding the first feature vector 405 based on the assistant feature vector 460.

The image processing apparatus 400 may add the assistant feature vector 460 to a position of a layer having the same size (for example, a size of $W_{mid} \times H_{mid}$) as that of the assistant feature vector 460 in an intermediate layer of the decoder 370 by a residual summation, to generate the target image 380.

Figure 5:
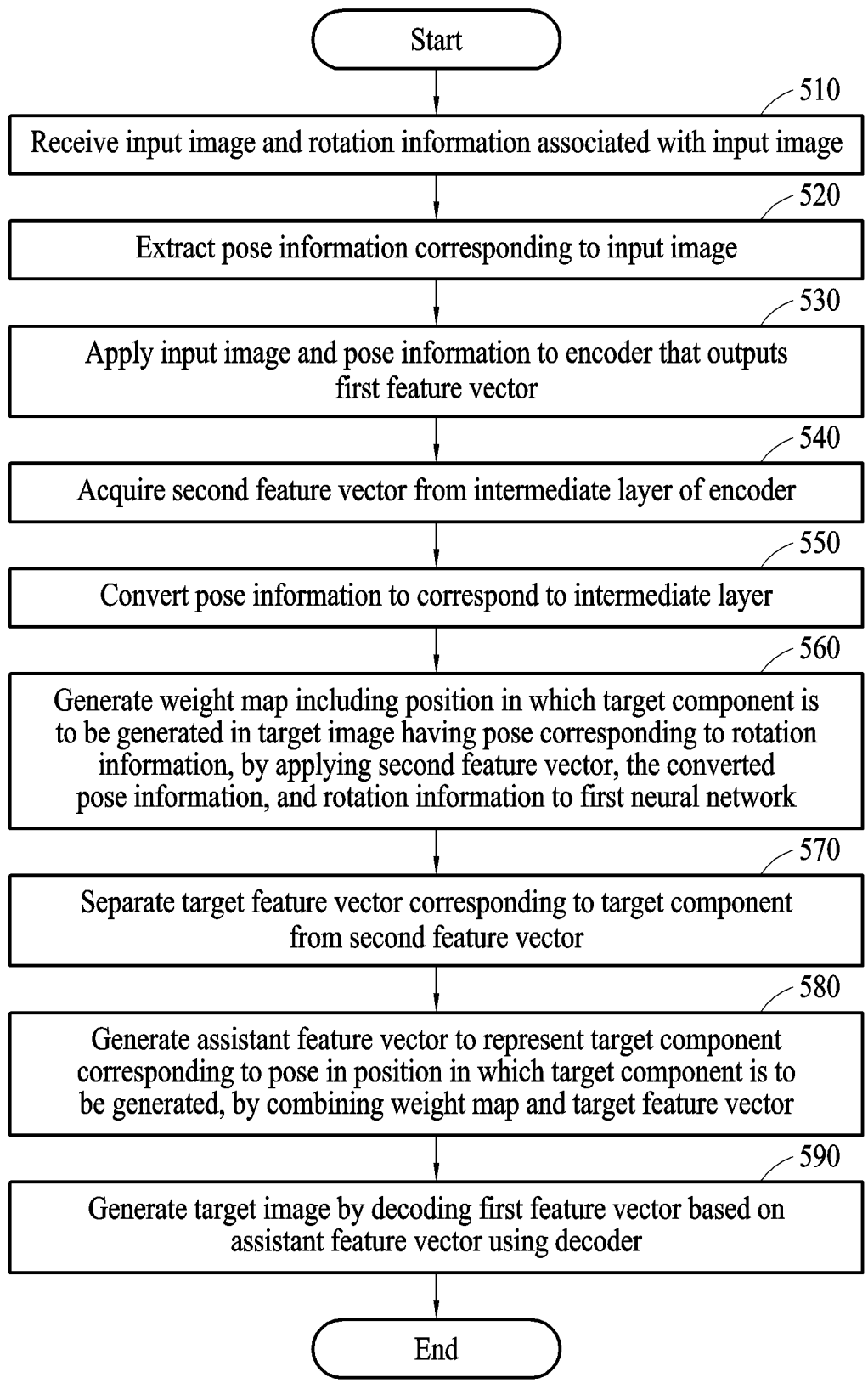
FIG. 5 illustrates another example of an image processing method, in accordance with one or more embodiments.

FIG. 5 illustrates an example of an image processing method, in accordance with one or more embodiments. FIG. 5 illustrates a process by which an image processing apparatus generates a target image through operations 510 to 590. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

In operation 510, the image processing apparatus may receive an input image and rotation information associated with the input image.

In operation 520, the image processing apparatus may extract pose information corresponding to the input image.

In operation 530, the image processing apparatus may apply the input image and the pose information to an encoder that outputs a first feature vector.

In operation 540, the image processing apparatus may acquire a second feature vector from an intermediate layer of the encoder.

In operation 550, the image processing apparatus may convert the pose information extracted in operation 520 to correspond to the intermediate layer.

In operation 560, the image processing apparatus may generate a weight map including a position in which a target component is to be generated in a target image having a pose corresponding to the rotation information, by applying the second feature vector, the converted pose information, and the rotation information to a first neural network.

In operation 570, the image processing apparatus may separate a target feature vector corresponding to the target component from the second feature vector.

In operation 580, the image processing apparatus may generate an assistant feature vector to represent a target component corresponding to the pose in the position in which the target component is to be generated, by combining the weight map and the target feature vector.

In operation 590, the image processing apparatus may generate a target image by decoding the first feature vector based on the assistant feature vector by implementing a decoder.

Figure 6:
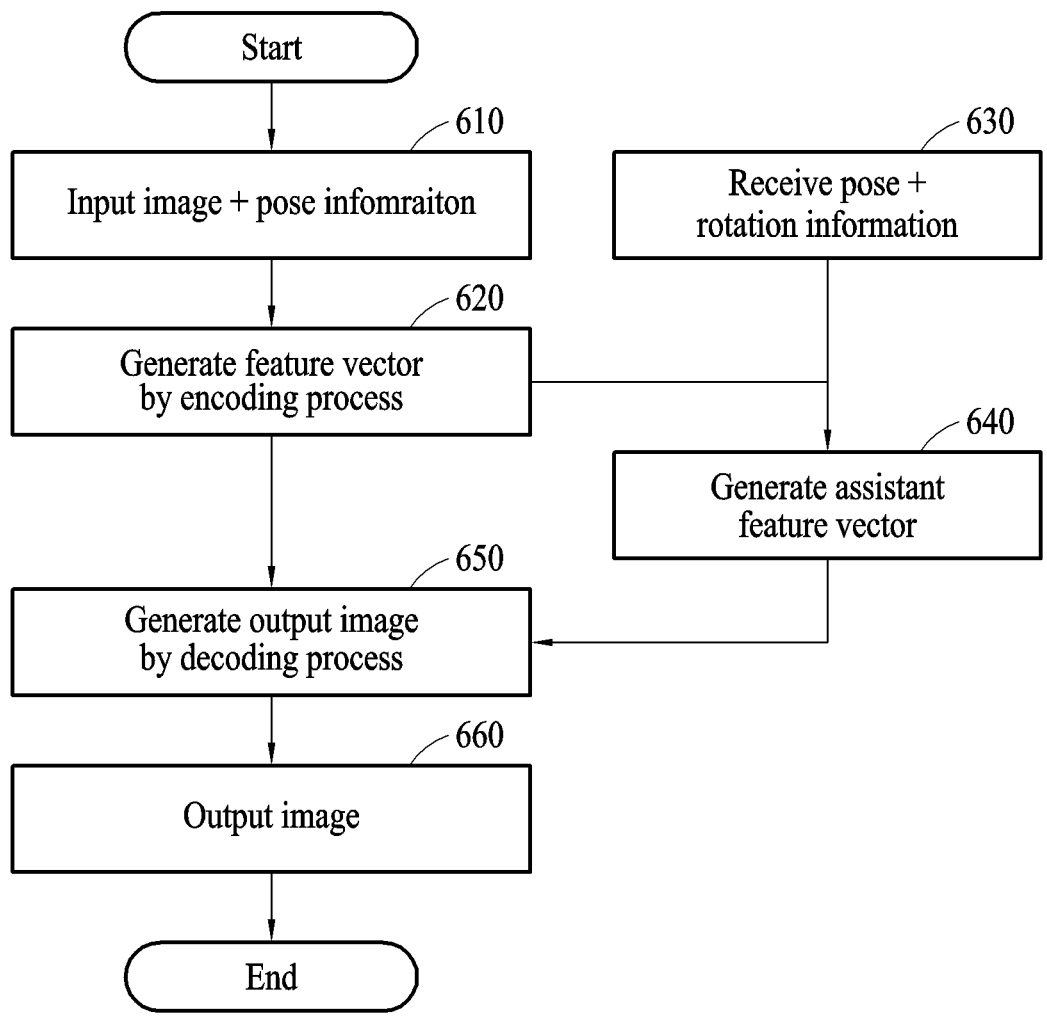
FIG. 6 illustrates another example of an image processing method, in accordance with one or more embodiments.

FIG. 6 illustrates an example of an image processing method. FIG. 6 illustrates a process by which an image processing apparatus generates an output image and outputs the output image through operations 610 to 660. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

In operation 610, the image processing apparatus may receive an input image and pose information corresponding to the input image.

In operation 620, the image processing apparatus may generate a feature vector of the input image through an encoding process, based on the pose information corresponding to the input image.

In operation 630, the image processing apparatus may receive pose information and rotation information to convert the input image.

In operation 640, the image processing apparatus may generate an assistant feature vector to represent a target component according to the pose information and the rotation information received in operation 630, using a facial component guidance device, based on the feature vector generated in operation 620 and the pose and the rotation information received in operation 630.

In operation 650, the image processing apparatus may generate an output image by decoding the feature vector generated in operation 620 based on the assistant feature vector generated in operation 640.

In operation 660, the image processing apparatus may output the output image. For example, the image processing apparatus may output the output image to the outside of the image processing apparatus, or may display the output image using a display included in the image processing apparatus.

Figure 7:
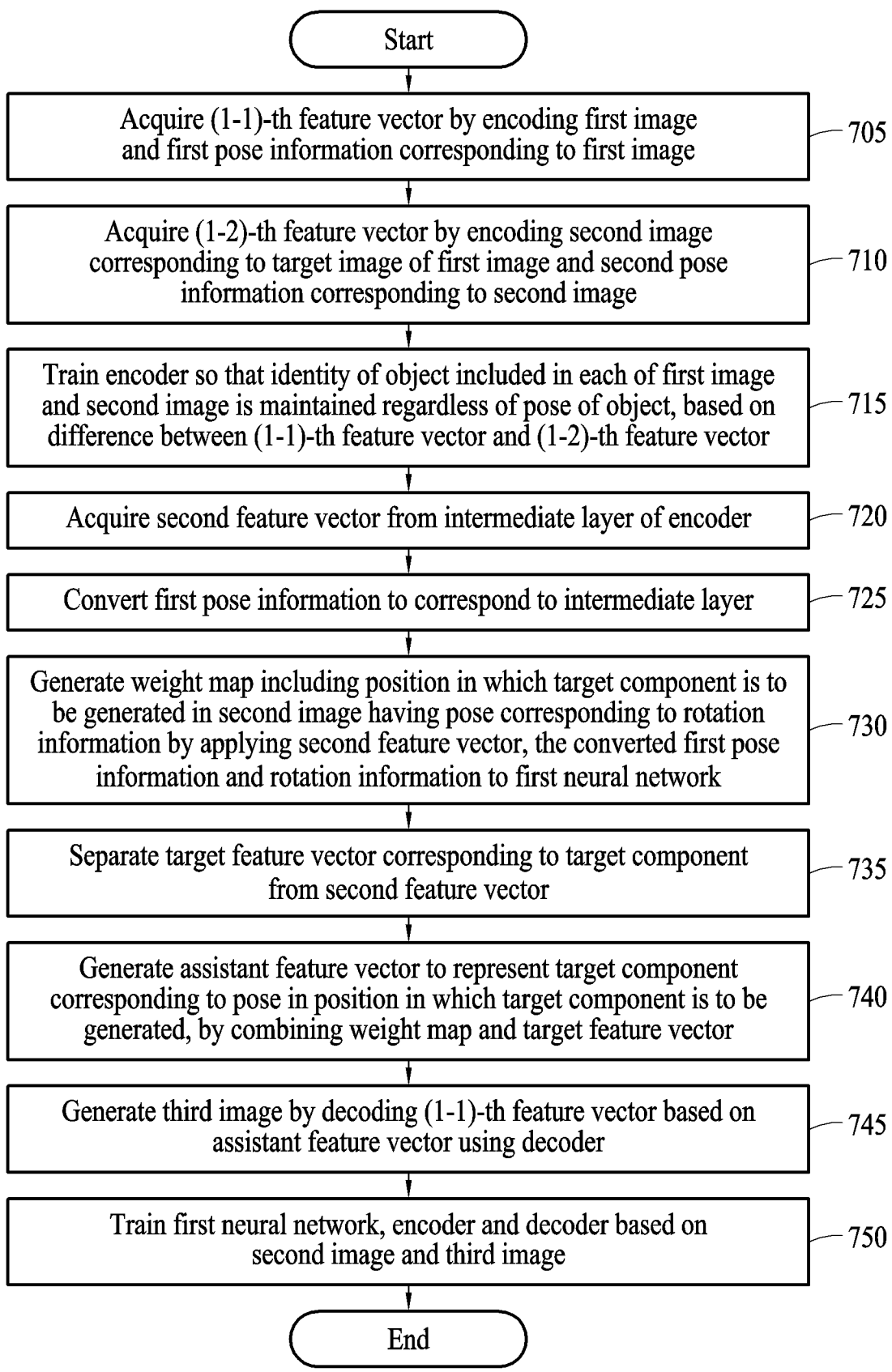
FIG. 7 illustrates an example of a training method, in accordance with one or more embodiments.

FIG. 7 illustrates an example of a training method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, a training apparatus may train neural networks that generate target images, through operations 705 to 750. The training of the neural networks is referred to as deep learning, and the deep learning may use various algorithm approaches, such as in a convolution neural network or a recurrent neural network. The training of a neural network may mean determining and updating weights and biases between layers or between a plurality of nodes that belong to different layers of adjacent layers.

In operation 705, the training apparatus may acquire a (1-1)-th feature vector by encoding a first image and first pose information corresponding to the first image.

In operation 710, the training apparatus may acquire a (1-2)-th feature vector by encoding a second image corresponding to a target image of the first image and second pose information corresponding to the second image.

In operation 715, the training apparatus may train the encoder so that an identity of an object included in each of the first image and the second image may be maintained regardless of a pose of the object, based on a difference between the (1-1)-th feature vector and the (1-2)-th feature vector.

In operation 720, the training apparatus may acquire a second feature vector from an intermediate layer of the encoder.

In operation 725, the training apparatus may convert the first pose information to correspond to the intermediate layer.

In operation 730, the training apparatus may generate a weight map including a position in which a target component is to be generated in the second image having a pose corresponding to rotation information by applying the second feature vector, the converted first pose information, and the rotation information to a first neural network.

In operation 735, the training apparatus may separate a target feature vector corresponding to the target component from the second feature vector.

In operation 740, the training apparatus may generate an assistant feature vector to represent a target component corresponding to a pose in the position in which the target component is to be generated, by combining the weight map and the target feature vector.

In operation 745, the training apparatus may generate a third image by decoding the (1-1)-th feature vector based on the assistant feature vector using a decoder.

In operation 750, the training apparatus may train the first neural network, the encoder, and the decoder based on the second image and the third image.

Figure 8:
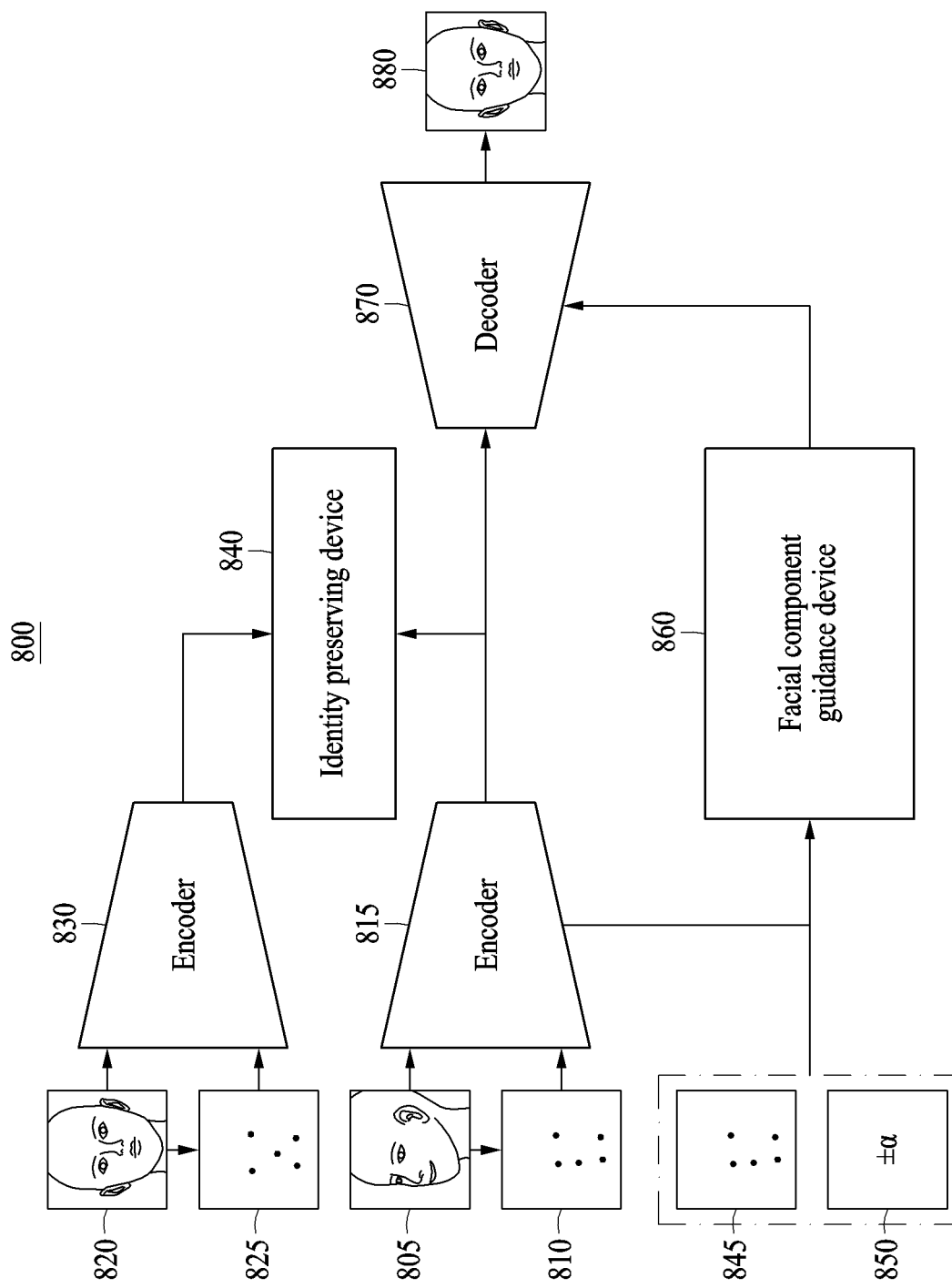
FIG. 8 illustrates an example of a structure of a training apparatus, in accordance with one or more embodiments.
Figure 9:
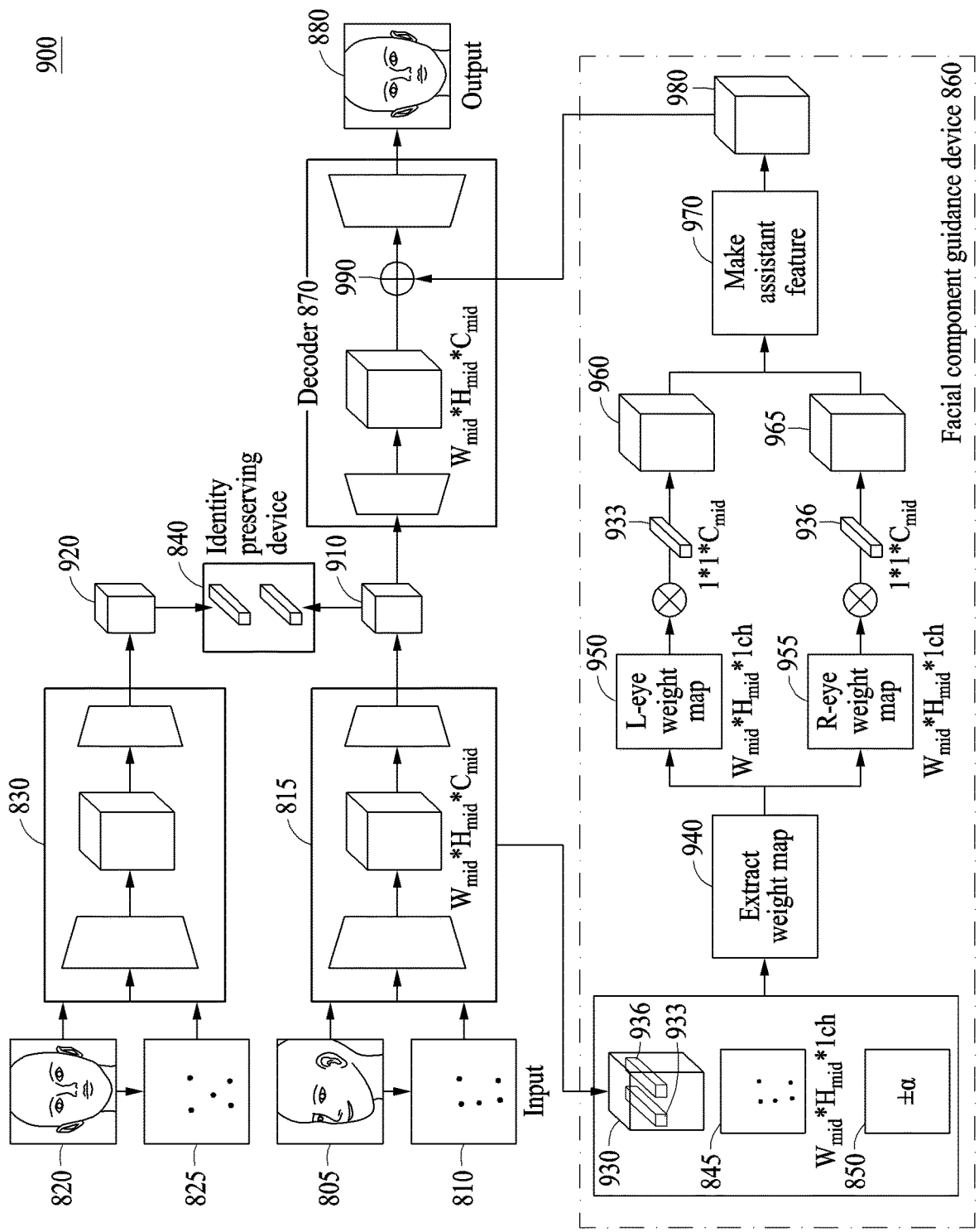
FIG. 9 illustrates another example of a structure of a training apparatus, in accordance with one or more embodiments.

FIG. 8 illustrates an example of a structure of a training apparatus, and FIG. 9 illustrates another example of a structure of a training apparatus. Referring to FIGS. 8 and 9, training apparatuses 800 and 900 may each include a first encoder 815, a second encoder 830, an identity preserving device 840, a facial component guidance device 860, and a decoder 870.

The training apparatuses 800 and 900 may acquire a (1-1)-th feature vector 910 by encoding a first image 805 and first pose information 810 corresponding to the first image 805 with the first encoder 815. In an example, the (1-1)-th feature vector 910 may have a size of W×H×C that is in a form different from $W_{mid} \times H_{mid} \times C_{mid}$ of a mid-size of an intermediate layer of the first encoder 815.

The training apparatuses 800 and 900 may acquire a (1-2)-th feature vector 920 by encoding a second image 820 and second pose information 825 corresponding to the second image 820 with the second encoder 830. The second image 820 may correspond to a target image of the first image 805.

The identity preserving device 840 may train the first encoder 815 so that an identity of an object included in each of the first image 805 and the second image 820 may be maintained regardless of a pose of the object, based on a difference between the (1-1)-th feature vector 910 and the (1-2)-th feature vector 920.

The training apparatuses 800 and 900 may acquire a second feature vector 930 from an intermediate layer of the first encoder 815. The second feature vector 930 may include second feature vectors 933 and 936 corresponding to a plurality of target components, as shown in FIG. 9. The second feature vectors 933 and 936 may, as non-limited examples, respectively correspond to a left eye and a right eye.

The facial component guidance device 860 may convert the first pose information 810 into first pose information 845 with a size corresponding to the intermediate layer.

The facial component guidance device 860 may generate weight maps 950 and 955, each including a position in which a target component is to be generated in a target image, by applying the second feature vector 930 acquired from the intermediate layer of the first encoder 815, the first pose information 845, and rotation information 850 associated with the first input image 805 to a first neural network 940.

The first neural network 940 may include neural networks with various structures and/or various types, for example, a DNN or a CNN. In an example, when the first neural network 940 is a CNN, each of the weight maps 950 and 955 may correspond to a feature map of one channel with a size of $W_{mid} \times H_{mid}$.

The facial component guidance device 860 may separate the second feature vectors 933 and 936 corresponding to target components from the second feature vector 930.

The facial component guidance device 860 may generate an assistant feature vector 980 to represent a target component corresponding to a pose in a position in which the target component is to be generated, by combining the weight maps 950 and 955 and the second feature vectors 933 and 936.

The facial component guidance device 860 may calculate a first result 960 by multiplying the weight map 950 and the second feature vector 933. The first result 960 may correspond to, for example, a feature of a channel $C_{\_mid}$ with the size of $W_{\_mid} \times H_{\_mid}$. Also, the facial component guidance device 860 may calculate a second result 965 by multiplying the weight map 955 and the second feature vector 936. The second result 965 may correspond to, for example, a feature of a channel $C_{\_mid}$ with the size of $W_{\_mid} \times H_{\_mid}$. Thus, the facial component guidance device 860 may change "$2 \times C_{\_mid}$" obtained by combining the first result 960 and the second result 965 to "$C_{\_mid}$", to finally generate the assistant feature vector 980 using an assistant feature generator 970. The assistant feature vector 980 may correspond to a feature vector of a channel $C_{\_mid}$ with the size of $W_{\_mid} \times H_{\_mid}$.

The decoder 870 may generate a third image 880 by decoding the (1-1)-th feature vector 910 output from the first encoder 815 based on the assistant feature vector 980 generated by the facial component guidance device 860.

The training apparatus 800 may generate the third image 880 by adding the assistant feature vector 980 to a position of a layer having the same size (for example, a size of $W_{mid} \times H_{mid}$) as that of the assistant feature vector 980 in an intermediate layer of the decoder 870 in operation 990.

The training apparatus 800 may train a neural network (not shown) included in the facial component guidance device 860, the first encoder module 815, and the decoder 870, based on the second image 820 and the third image 880. The training apparatus 800 may train the first neural network 940, the first encoder 815, and the decoder 870, to minimize a loss between the second image 820 and the third image 880.

The first neural network 940, the first encoder 815, and the decoder 870 of the training apparatus 800 may be trained based on various loss functions. A loss function may be determined based on a single loss or a combination of a plurality of losses. The training apparatus 800 may be trained by optimizing a parameter of a neural network based on a loss function.

A loss for generation of a loss function may include, for example, a perceptual loss between the second image 820 corresponding to a target image and the third image 880 corresponding to an output image, a pixelwise loss generated by pixel-wise comparing the second image 820 and the third image 880, an identity preserving loss generated by comparing identification information of the second image 820 and identification information of the third image 880, a loss that is based on a difference between pixel values of pixels of the third image 880, and a generative adversarial network (GAN) loss that is based on the second image 820 and the third image 880.

The perceptual loss between the second image 820 and the third image 880 and the pixelwise loss generated by pixel-wise comparing the second image 820 and the third image 880 may correspond to a loss determined by comparing the second image 820 and the third image 880. Also, the perceptual loss between the second image 820 and the third image 880 may correspond to a perceptual loss generated by comparing a feature extracted from the third image 880 and a feature extracted from the second image 820. The pixelwise loss generated by pixel-wise comparing the second image 820 and the third image 880 may correspond to a loss generated based on a difference between a pixel value of the third image 880 and a pixel value of the second image 820 corresponding to the pixel value of the third image 880. In an example, a model may be trained based on a loss determined by comparing the second image 820 and the third image 880, to generate the third image 880 similar to the second image 820.

The loss that is based on the difference between pixel values of pixels of the third image 880 may correspond to a loss that is based on a difference between pixel values of neighboring pixels in the third image 880. In an example, a model may be trained based on a loss determined based on pixel values of pixels in the third image 880, to generate an output image in which neighboring pixels are naturally connected.

The identity preserving loss generated by comparing the identification information of the second image 820 and the identification information of the third image 880 may be determined based on a second feature vector acquired from the second image 820 and a second feature vector associated with identification information acquired from the first image 805 corresponding to an input image. In other words, the identity preserving loss may correspond to a loss for synthesizing a face in the third image 880 while maintaining an identity of identification information of the face in the third image 880.

Figure 10:
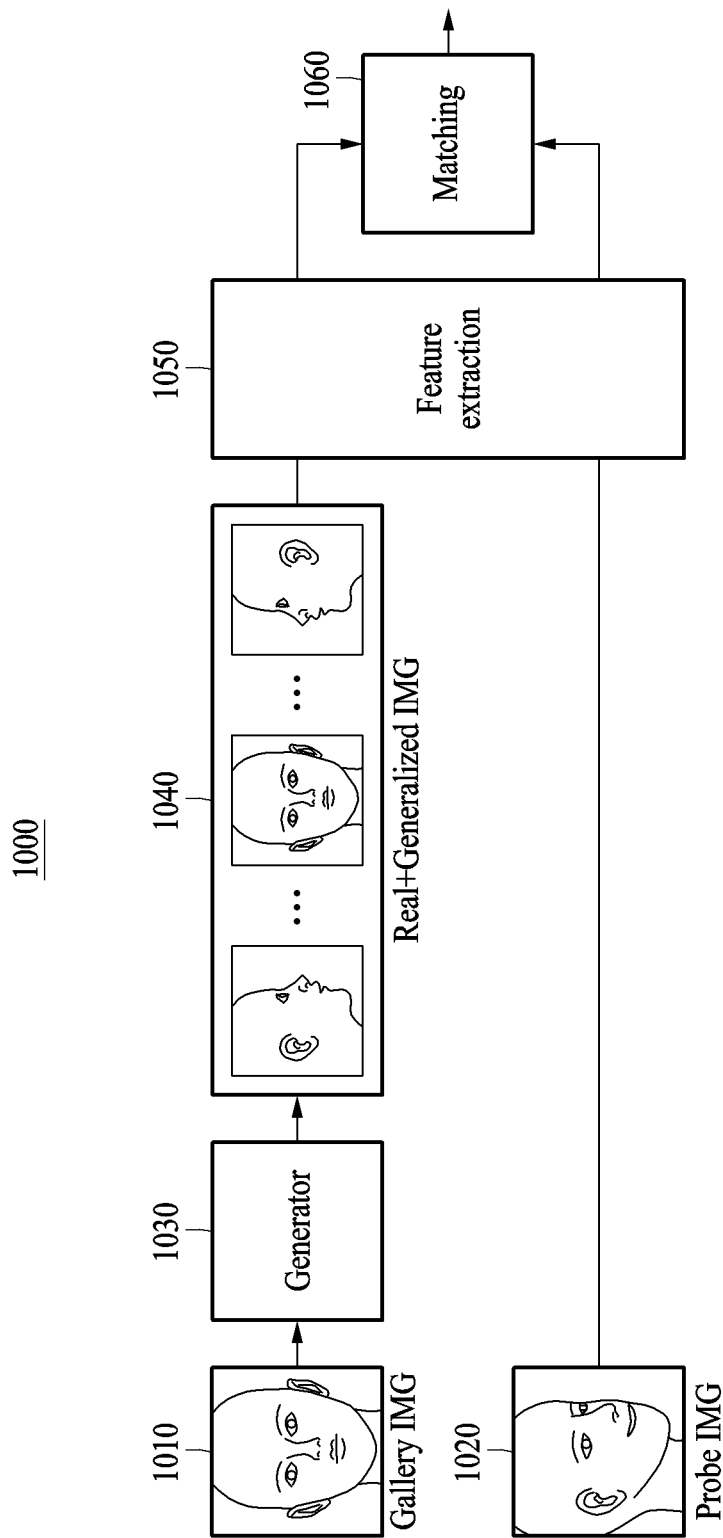
FIGS. 10 and 11 illustrate examples of implementing an image processing apparatus as a facial image generator.

FIG. 10 illustrates an example of implementing an image processing apparatus as a face image generator, in accordance with one or more embodiments.

Referring to FIG. 10, in an example, the image processing apparatus may operate as a face image generator 1030 in a user authentication apparatus 1000 that matches an image Gallery IMG 1010 of a user that is stored in advance, and an authentication target image Probe IMG 1020 that is newly input.

When the image 1010 is input, the face image generator 1030 may generate output images 1040 including faces of various poses that may be converted from the image 1010. The user authentication apparatus 1000 may perform user authentication based on the authentication target image 1020 and the output images 1040. In this example, rotation information used in the face image generator 1030 may be determined based on various face poses that are set in advance. The user authentication apparatus 1000 may perform user authentication based on the authentication target image 1020 and the output images 1040 generated by the face image generator 1030. The user authentication apparatus 1000 may select one output image corresponding to a face pose similar to the authentication target image 1020 from the output images 1040. The user authentication apparatus 1000 may extract features from each of the selected output image and the authentication target image 1020 in operation 1050, and may match the extracted features in operation 1060, to perform the user authentication.

Figure 11:
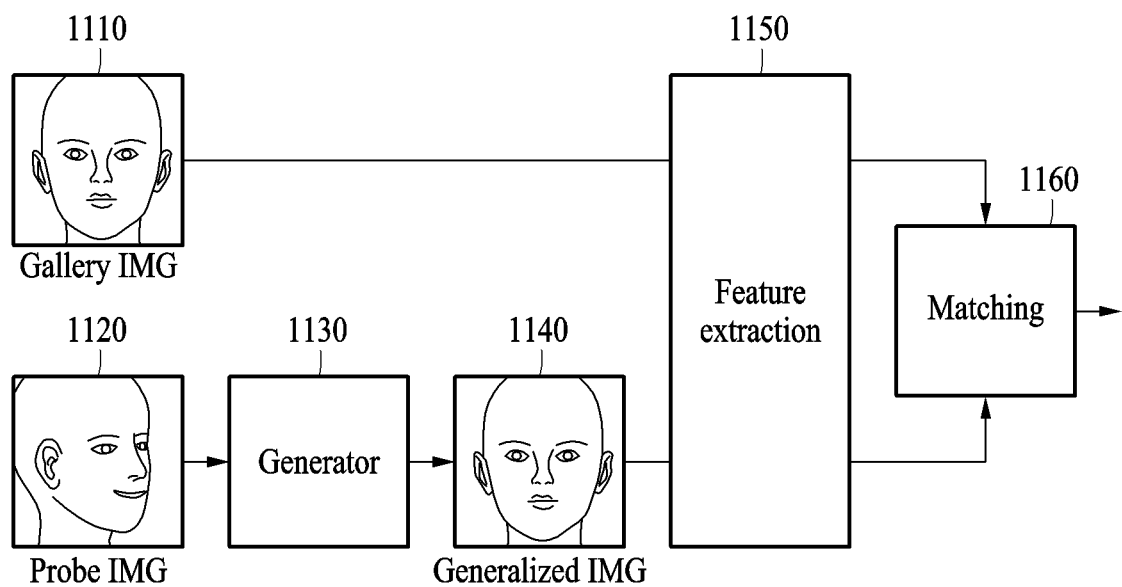

FIG. 11 illustrates an example of implementing an image processing apparatus as a face image generator. Referring to FIG. 11, the image processing apparatus may operate as a face image generator 1130 in a user authentication apparatus 1100 that matches an image Gallery IMG 1110 of a user that is stored in advance and an authentication target image Probe IMG 1120 that is newly input.

The user authentication apparatus 1100 may input the authentication target image 1120 to the face image generator 1130 and may generate a generalized image Generalized IMG 1140 from the authentication target image 1120. The generalized image 1140 may correspond to an image obtained by converting a pose of the authentication target image 1120 to a frontal pose.

The user authentication apparatus 1100 may perform user authentication based on the image 1110 and the generalized image 1140. The user authentication apparatus 1100 may extract features from each of the image 1110 and the generalized image 1140 in operation 1150, and may match the extracted features in operation 1160, to perform the user authentication.

Figure 12:
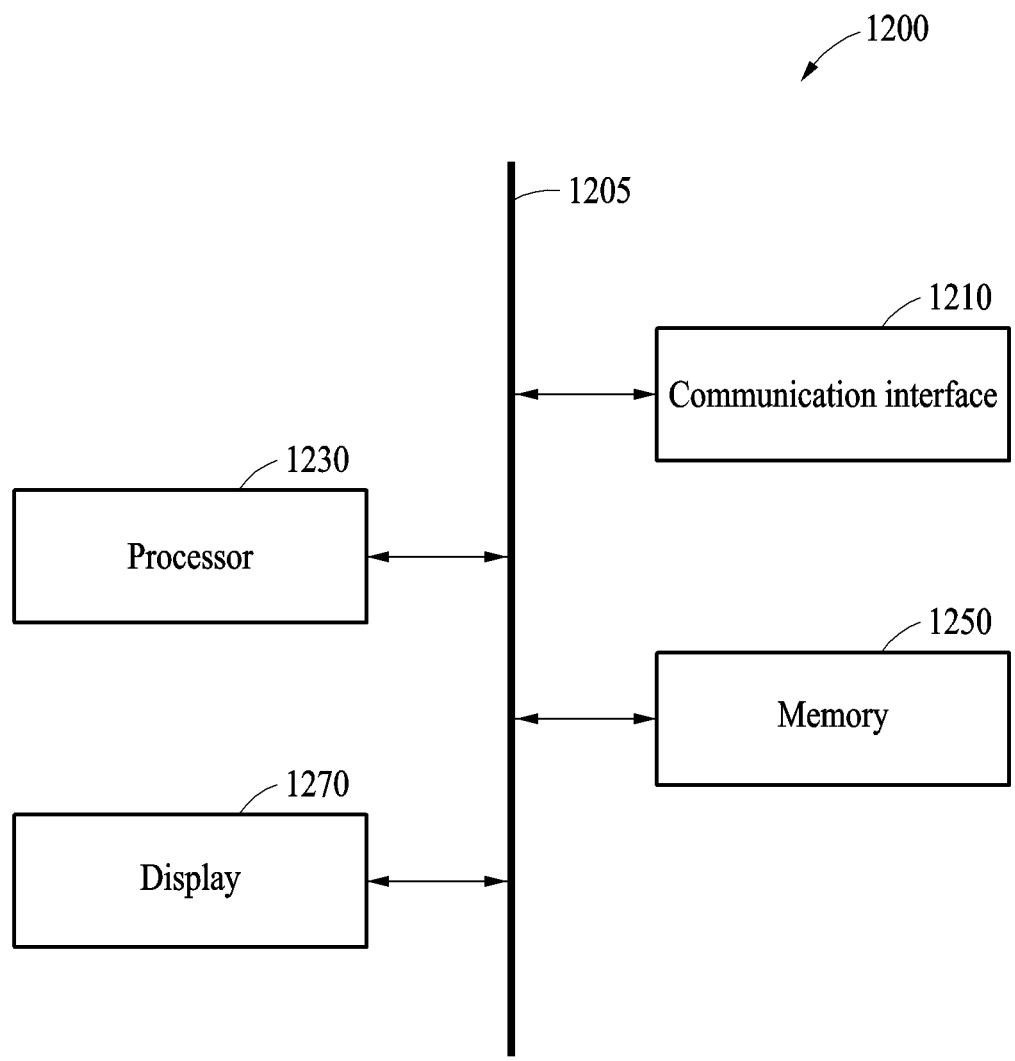
FIG. 12 illustrates an example of an image processing apparatus, in accordance with one or more embodiments.

FIG. 12 illustrates an image processing apparatus 1200. Referring to FIG. 12, the image processing apparatus 1200 may include a communication interface 1210, a processor 1230, a memory 1250, and a display 1270. The communication interface 1210, the processor 1230, the memory 1250, and the display 1270 may be connected to each other via a communication bus 1205.

The communication interface 1210 may receive an input image and rotation information associated with the input image.

The processor 1230 may generate a feature vector of the input image based on pose information corresponding to the input image. The processor 1230 may generate an assistant feature vector to represent a target component according to a pose corresponding to the rotation information, based on the feature vector, the pose information, and the rotation information. The processor 1230 may generate a target image having the pose corresponding to the rotation information based on the feature vector and the assistant feature vector.

Also, the processor 1230 may perform one or more of the methods described with reference to FIGS. 1 through 11, or an algorithm corresponding to one or more of the methods. The processor 1230 may be a hardware-implemented image processing apparatus having a circuit that is physically structured to execute desired operations. For example, the desired operations may include code or instructions included in a program. The hardware-implemented image processing apparatus may include, for example, a microprocessor, a central processing unit (CPU), a graphics processing unit (GPU), a processor core, a multi-core processor, a multi-processor, an application-specific integrated circuit (ASIC), a field-programmable gate array (FPGA), and a neural processing unit (NPU).

The processor 1230 may execute a program and may control the image processing apparatus 1200. Code of the program executed by the processor 1230 may be stored in the memory 1250.

The memory 1250 may store the input image and/or the rotation information received by the communication interface 1210. The memory 1250 may store the feature vector and/or the assistant feature vector generated by the processor 1230. Also, the memory 1250 may store the target image generated by the processor 1230.

The memory 1250 may store a variety of information generated in a processing process of the above-described processor 1230. Also, the memory 1250 may store a variety of data and programs. The memory 1250 may include, for example, a volatile memory or a non-volatile memory. The memory 1250 may include a high-capacity storage medium such as a hard disk to store a variety of data.

Depending on examples, the image processing apparatus 1200 may display the target image generated by the processor 1230 using the display 1270.

The image processing apparatus 1200 may correspond to apparatuses in various fields, for example, an advanced driver-assistance system (ADAS), a head-up display (HUD), a three-dimensional (3D) digital information display (DID), a navigation device, a neuromorphic device, a 3D mobile device, a smartphone, a smart television (TV), a smart vehicle, an Internet of Things (IoT) device, a medical device, and a measuring device. The 3D mobile device may be understood to include, for example, a display device configured to display augmented reality (AR), virtual reality (VR), and/or mixed reality (MR), a head-mounted display (HMD), and a face-mounted display (FMD).

The neural network apparatuses, the imaging processing apparatus 300, encoder 330, decoder 370, facial component guidance device 360, training apparatuses 800 and 900, encoders 830 and 815, decoder 870, identity preserving device 840, facial component guidance device 860, user authentication apparatuses 1000 and 1100, processor 1230, memory 1250, display 1270, communication interface 120, and other apparatuses, units, modules, devices, and other components described herein and with respect to FIGS. 1-8, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-12, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented image processing method, comprising:
   receiving an input image and rotation information associated with the input image;
   generating a feature vector of the input image based on pose information corresponding to the input image;
   generating an assistant feature vector which represents a target component according to a pose corresponding to the rotation information based on the feature vector, the pose information, and the rotation information; and
   generating a target image which has the pose corresponding to the rotation information based on the feature vector and the assistant feature vector.

2. The method of claim 1, wherein the generating of the assistant feature vector comprises:
   converting the pose information to correspond to an intermediate layer of an encoder;
   generating a weight map which includes a position in which the target component is to be generated in the target image, based on the feature vector, the converted pose information and the rotation information; and
   generating the assistant feature vector which represents the target component corresponding to the pose in the position in which the target component is to be generated, by combining the weight map and a target feature vector separated from the feature vector.

3. The method of claim 2, wherein the generating of the weight map comprises generating the weight map which includes the position in which the target component is to be generated in the target image by applying the feature vector, the converted pose information, and the rotation information to a first neural network.

4. The method of claim 2, wherein the generating of the weight map comprises generating a weight map which includes a position in which each of a plurality of target components is to be generated in the target image, based on the feature vector, the converted pose information and the rotation information.

5. The method of claim 2, wherein the generating of the assistant feature vector comprises:
   separating the target feature vector corresponding to the target component from the feature vector; and
   generating the assistant feature vector which represents the target component corresponding to the pose in the position in which the target component is to be generated, by combining the weight map and the target feature vector.

6. The method of claim 1, wherein the generating of the feature vector
   comprises:
   estimating the pose information from the input image;
   applying the input image and the pose information to an encoder that outputs the feature vector; and
   acquiring the feature vector from an intermediate layer of the encoder.

7. The method of claim 6, wherein the estimating of the pose information comprises:
   generating a landmark hit map corresponding to an object including the target component by extracting landmarks of the object from the input image; and
   estimating the pose information based on the landmark hit map.

8. The method of claim 1, wherein the rotation information comprises any one or any combination of a rotation direction in which an object in the input image is to be rotated to generate the target image, and a value which indicates a degree of rotation of the object.

9. The method of claim 1, wherein the pose information comprises a landmark hit map corresponding to a face included in the input image.

10. The method of claim 1, wherein the generating of the target image comprises generating the target image by decoding the feature vector with a decoder based on the assistant feature vector.

11. The method of claim 10, wherein the generating of the target image comprises generating the target image by summing the assistant feature vector and the feature vector during the decoding of the feature vector.

12. The method of claim 1, wherein:
the input image comprises a face; and
the target component comprises any one or any combination of an eye, a nose, a mouth, and a mouth corner.

13. A non-transitory computer-readable storage medium storing instructions that, when executed by a processor, cause the processor to perform the method of claim 1.

14. A processor-implemented training method comprising:
acquiring a (1-1)-th feature vector by encoding a first image and first pose information corresponding to the first image;
acquiring a (1-2)-th feature vector by encoding a second image corresponding to a target image of the first image and second pose information corresponding to the second image;
training an encoder to maintain an identity of an object included in each of the first image and the second image, regardless of a pose of the object, based on a difference between the (1-1)-th feature vector and the (1-2)-th feature vector;
acquiring a second feature vector from an intermediate layer of the encoder;
converting the first pose information to correspond to the intermediate layer;
generating a weight map including a position in which a target component is to be generated in the second image which has a pose corresponding to rotation information by applying the second feature vector, the converted first pose information and the rotation information to a first neural network;
separating a target feature vector corresponding to the target component from the second feature vector;
generating an assistant feature vector which represents the target component corresponding to the pose in the position in which the target component is to be generated, by combining the weight map and the target feature vector;
generating a third image by decoding, with a decoder, the (1-1)-th feature vector based on the assistant feature vector; and
training the first neural network, the encoder and the decoder based on the second image and the third image.

15. An image processing apparatus comprising:
a communication interface configured to receive an input image and rotation information associated with the input image; and
one or more processors, configured to:
generate a feature vector of the input image based on pose information corresponding to the input image;
generate an assistant feature vector which represents a target component according to a pose corresponding to the rotation information, based on the feature vector, the pose information, and the rotation information; and
generate a target image which has the pose corresponding to the rotation information based on the feature vector and the assistant feature vector.

16. The image processing apparatus of claim 15, wherein the one or more processors are configured to:
convert the pose information to correspond to an intermediate layer of an encoder;
generate a weight map which includes a position in which the target component is to be generated in the target image, based on the feature vector, the converted pose information and the rotation information; and
generate the assistant feature vector which represents the target component corresponding to the pose in the position in which the target component is to be generated, by combining the weight map and a target feature vector separated from the feature vector.

17. The image processing apparatus of claim 16, wherein the one or more processors are configured to generate the weight map which includes the position in which the target component is to be generated in the target image by applying the feature vector, the converted pose information and the rotation information to a first neural network.

18. The image processing apparatus of claim 16, wherein the one or more processors are configured to generate a weight map which includes a position in which each of a plurality of target components is to be generated in the target image, based on the feature vector, the converted pose information and the rotation information.

19. The image processing apparatus of claim 16, wherein the one or more processors are configured to:
separate the target feature vector corresponding to the target component from the feature vector; and
generate the assistant feature vector which represents the target component corresponding to the pose in the position in which the target component is to be generated, by combining the weight map and the target feature vector.

20. The image processing apparatus of claim 15, wherein the image processing apparatus comprises any one or any combination of a user authentication device, an advanced driver-assistance systems (ADAS), a head-up display (HUD) device, a three-dimensional (3D) digital information display (DID), a navigation device, a neuromorphic device, a 3D mobile device, a smartphone, a smart television (TV), a smart vehicle, an Internet of things (IoT) device, and a medical device.

21. A processor-implemented method, comprising:
receiving an input image, and pose information and rotation information corresponding to the input image;
encoding the input image and the pose information with an encoder device, which includes a first neural network, to generate a first feature vector of the input image;
generating a second feature vector, based on the pose information, the rotation in formation and the first feature vector; and
generating a target image, which has a pose corresponding to the rotation information, based on the first feature vector and the second feature vector,
wherein the target image is generated by decoding the first feature vector with a decoder device, which includes a second neural network, based on the second feature vector.

22. The method of claim 21, wherein the pose corresponding to the rotation information comprises at least one of a frontal pose or a side pose of a facial image.

23. The method of claim 21, wherein the decoder generates the target image by rotating an object in the input image by one or more of a rotational angle and a rotational direction corresponding to the rotation information.

* * * * *